United States Patent
Eckardt et al.

(10) Patent No.: US 12,457,104 B2
(45) Date of Patent: Oct. 28, 2025

(54) PERSONALIZATION OF A SECURE ELEMENT

(71) Applicant: GIESECKE+DEVRIENT MOBILE SECURITY GMBH, Munich (DE)

(72) Inventors: Stefan Eckardt, Mammendorf (DE); Martin Rosner, Haag in Oberbayern (DE); Beegek Lim, Haar (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 308 days.

(21) Appl. No.: 17/927,506

(22) PCT Filed: May 26, 2021

(86) PCT No.: PCT/EP2021/025193
§ 371 (c)(1),
(2) Date: Nov. 23, 2022

(87) PCT Pub. No.: WO2021/239272
PCT Pub. Date: Dec. 2, 2021

(65) Prior Publication Data
US 2023/0171100 A1 Jun. 1, 2023

(30) Foreign Application Priority Data
May 29, 2020 (DE) ............ 10 2020 003 275.3

(51) Int. Cl.
*H04L 9/14* (2006.01)
*H04L 9/08* (2006.01)

(52) U.S. Cl.
CPC ........... *H04L 9/14* (2013.01); *H04L 9/085* (2013.01)

(58) Field of Classification Search
CPC .................. H04L 9/14; H04L 9/065
See application file for complete search history.

(56) References Cited

U.S. PATENT DOCUMENTS 9,436,940 B2 * 9/2016 Tremlet ............... G09C 1/00
9,686,076 B2   6/2017 Hauck et al.
(Continued)

FOREIGN PATENT DOCUMENTS

| DE | 102017212994 B3 | 11/2018 |
| EP | 2711858 A1 | 3/2014 |
| EP | 3648493 A1 | 5/2020 |

OTHER PUBLICATIONS

Office Action Abstract from corresponding German Application No. 10 2020 003 275.3, Jan. 29, 2021.
(Continued)

*Primary Examiner* — Dhairya A Patel
*Assistant Examiner* — Eui H Kim
(74) *Attorney, Agent, or Firm* — Workman Nydegger (57) ABSTRACT

A method for personalizing an integrated secure element, which is permanently installed in a mobile end device. The method involves the agreement of a shared secret between the secure element and an HSM, encrypting an operating system, and possibly personalization data and/or one or several profiles, in the HSM based on the shared secret and transferring the encrypted operating system to the secure element, and re-encrypting the operating system in the secure element for storage in the NVM memory of the mobile end device.

19 Claims, 3 Drawing Sheets

(56) References Cited

U.S. PATENT DOCUMENTS

| | | |
|---|---|---|
| 10,367,810 B2 | 7/2019 | Li et al. |
| 2014/0031024 A1* | 1/2014 | Xie ........................ G06Q 20/36 |
| | | 455/418 |
| 2017/0214662 A1* | 7/2017 | Chu ....................... H04L 9/0869 |
| 2018/0097639 A1 | 4/2018 | Gulati et al. |
| 2018/0205561 A1* | 7/2018 | Le Saint ............... H04L 9/3268 |
| 2018/0351945 A1 | 12/2018 | Li et al. |
| 2020/0242274 A1* | 7/2020 | Pan .......................... G07G 1/14 |

OTHER PUBLICATIONS

International Search Report from corresponding PCT Application No. PCT/EP2021/025193, Aug. 13, 2021.

* cited by examiner

At the SE manufacturer:
- ECC key pair (private/public)
- SE public key (SE-ECC public key)

At the operating system manufacturer:
- transport key (SE-ECC public; OS-ECC private)

At the end device manufacturer or chip set manufacturer:
- OS ECC key from the memory image BLOB
- SE-ECC private key and ECC public key, transport key
- Signature key

PERSONALIZATION OF A SECURE ELEMENT

FIELD OF THE INVENTION

The invention relates to a method for personalizing a secure element which is installed permanently in a mobile end device.

STATE OF THE ART

The world is networked in mobile manner, and mobile connectivity is progressing further. Mobile communication-enabled end devices, or briefly mobile end devices, communicate via mobile communication networks. Smart phones and mobile phones are among the classic mobile (mobile communication-enabled) end devices. Mobile (mobile communication-enabled) end devices further include regulation devices (control devices or measuring devices or combined control/measuring devices) for industrial facilities in commercial or private environments. Industrial facilities are for example production plants, which have one or several regulation devices (end devices) which can communicate with a background system or/and with each other via a mobile communication network. Other industrial facilities are smart home equipment such as e.g. heaters or electricity consumers with end devices in the form of regulation devices.

To utilize a mobile (mobile communication-enabled) end device, such as smart phones or mobile phones, in a mobile communication network of a network operator, the end device contains a secure element or subscriber identity module with a subscription profile or briefly profile. The profile achieves the configuration of the end device and of the connection of the end device in the mobile communication network.

At a point in time close to the start of the secure element's life cycle, the secure element is personalized, wherein an operating system and personalization data are programmed in such that the operating system can be brought to execution with the personalization data in the secure element. After the personalization, in particular the introduction of the operating system, profiles can be loaded into the secure element.

The end device itself has a chip set comprising one or several end device chips for operating functions of the end device. Current smart phones typically have, for example, a chip set with at least three end device chips, namely a transceiver IC which carries out the physical radio communication, a baseband processor (or synonymous modem) which carries out functions for data transfer via radio communication at the protocol level, and an application processor AP on which the operating system and application software are executed. Transceiver ICs for other radio channels can be provided as further end device chips, in particular for short-range radio channels such as NFC (NFC: near field communication) or Bluetooth. The communication within the chip set, between the chips of the chip set, takes place, for example, via a bus system.

Secure elements can be configured in different form factors, in particular plug-in, embedded, integrated and software. Secure elements of the form factor plug-in can be easily inserted into and removed from the end device. Examples of plug-in secure elements are SIM cards (SIM=Subscriber Identity Module) or USIM cards (Universal SIM) or UICC (Universal Integrated Circuit Card) and contact the end device via a card reader. In addition to the plug-in secure elements, there are embedded secure elements, which are arranged on a dedicated, extra housed chip or SoC (system-on-chip) and permanently installed in an end device (e.g. soldered), but are otherwise constructed similarly to a plug-in secure element. As a standard, an eUICC/eSE has its own internal non-volatile NVM memory in which the operating system, personalization data, subscription profiles and applications are stored.

Plug-in secure elements such as e.g. SIM cards (UICCs) and embedded secure elements (eUICCs) can easily be personalized by the manufacturer of the secure element and sold to a customer in a completely personalized state.

A further form factor of a secure element is the integrated secure element, which is not yet widespread on the market and is fully or partially integrated on an end device chip or SoC (system-on-chip) of the end device's chip set, i.e. not provided on an extra chip, separated chip. Integrated subscriber identity modules are supplied with the addition "integrated" and are referred to e.g. as integrated UICC, or iUICC or iSE for short. The integrated secure element has an internal secure processor and internal memory within a region on the chip set assigned to the secure element, but hardly any internal non-volatile NVM memory that could be employed for secure permanent storage of the operating system, personalization data and profiles. For this reason, the approach followed for integrated secure elements is to store secure element data such as the operating system, personalization data and profiles in encrypted form in an external non-volatile NVM memory provided outside of the secure element but still in the chip set of the mobile end device. Only the secure element can decrypt the secure element data stored in encrypted form in the external NVM memory, such as the operating system and profiles, and execute them exclusively within the secure element (by the secure processor in the internal working memory of the secure element). The end device, on the other hand, cannot decrypt and bring to execution the secure element data such as the operating system and profiles.

The utilization of external non-volatile NVM memories of the end device is also being discussed for embedded secure elements, also referred to as eUICC or eSE for short. In the concepts discussed here, eUICC data such as operating systems, profiles or applications that are intended for the eUICC are stored in a non-volatile NVM memory of the end device that is outside of the eUICC.

To personalize a secure element that employs an external NVM memory of the mobile end device by storing the operating system and personalization data in the external NVM memory of the mobile end device, the secure element must already be combined with the external non-volatile NVM memory, because otherwise the external non-volatile NVM memory is not yet available to the secure element. This is achieved, for example, by both the external non-volatile NVM memory and the secure element having been installed in the mobile end device. The manufacturer of the secure element must therefore release the secure element from his power of disposal already prior to the personalization, for example to the power of disposal of the end device manufacturer.

The complete production chain for installing an iUICC in a mobile end device typically provides that a chip set comprising a secure element is first made. The chip set manufacturer makes available the chip set equipped with the secure element to the manufacturer of the mobile end device, who permanently installs the chip set with the integrated secure element in the mobile end device. The manufacturer of the mobile end device additionally installs in the end device an external NVM memory that is intended for the secure element. Only after this step is it physically possible in the first place to load the operating system OS or to personalize the secure element.

The chip set, including a secure element integrated therein, can be provided as a single system-on-chip, which can be soldered into an end device as a monolithic component. Alternatively, the secure element manufacturer manufactures a secure element unit and makes it available to a chip set manufacturer. The chip set manufacturer integrates the secure element unit into a chip set for a mobile end device, e.g. by soldering the secure element unit onto a circuit board onto which other elements of the chip set are also soldered. Finally, the chip set is integrated into the end device, e.g. soldered in.

If the manufacturer of the secure element were to simply hand over the operating system and the personalization data to the manufacturer of the mobile end device along with the secure element, the operating system and the personalization data would be completely outside the sphere of influence of the manufacturer of the secure element. The manufacturer of the end device could potentially employ the operating system and the personalization data largely as desired, even for such purposes of use that the manufacturer of the secure element or the manufacturer of the operating system and the personalization data would not approve of. This is a risk for the manufacturer of the secure element and for the manufacturer of the operating system and the personalization data and is therefore not desirable.

The document EP 3 648 493 discloses a method for personalizing a chip in a chip set of a mobile end device by storing an operating system encrypted with an image protection key into the chip set, so that the operating system can later be executed in the chip. In order for the operating system to be executable on the chip, the chip is equipped with the image protection key. The image protection key is divided into two key components, and the one component is issued to a chip manufacturer and the other key component to an end device manufacturer, so that neither manufacturer has the complete image protection key. The two manufacturers load their key components into the chip one after the other. The image protection key is only reconstructed from the two key components in the chip, so that an encrypted operating system loaded into the chip can be decrypted and brought to execution on the chip.

The document DE 10 2017 212 994 B3 discloses a method for carrying out an installation session for an electronic subscriber identity module, eSIM, in an eUICC, wherein the eUICC generates a secret with an eSIM server, receives an encrypted eSIM packet from the eSIM server and decrypts this with the secret. Using an error correction configuration previously received from the eSIM server, the eUICC is able to generate the secret also later, for example to receive and decrypt the encrypted eSIM packet again later for test purposes.

The document U.S. Pat. No. 9,686,076 B2 discloses a method for transferring an eSIM from a source device to a target device, wherein the eSIM is encrypted specifically for the target device and destroyed in the source device.

SUMMARY OF THE INVENTION

The object of the invention is to create a method for personalizing a secure element permanently installed in a mobile end device, in which the manufacturer of the secure element or/and the manufacturer of the operating system retain power of disposal over the personalization process and the control of the personalization process is not fully passed on to the manufacturer of the mobile end device.

In the method according to the invention, the possibility of confidential communication with the secure element is first created. For this purpose, before the chip set with the secure element is permanently installed in the mobile end device, there takes place (a) a making available of a SE private key of an asymmetric SE key pair in the secure element, and a making available of the SE public key of the same asymmetric SE key pair in a hardware security module HSM arranged outside of the secure element. These steps preferably take place as long as the chip set with the secure element is in the power of disposal of the secure element/chip set manufacturer or the manufacturer or provider of the operating system, in any case not yet in the power of disposal of the manufacturer of the mobile end device.

The asymmetric SE key pair is selectively generated in the secure element, and the SE public key is transferred from the secure element to the hardware security module (model of on-board key generation). Alternatively, the asymmetric SE key pair is generated in the hardware security module and the SE private key is transferred by the hardware security module to the secure element (model of key injection). The hardware security module employed for key injection can be the same hardware security module that is later employed for encrypting the memory image (see below), or another hardware security module that has the required keys. In particular, required keys can be transferred from one hardware security module to another hardware security module via suitable mechanisms if required.

Only after the SE private key has been made available to the secure element and the SE public key to the hardware security module is the secure element delivered to the manufacturer of the mobile end device, and there takes place (b) the permanent installation of the secure element in a mobile end device.

Selectively, the secure element is installed in a chip set prior to being made available to the mobile end device manufacturer, and the chip set is delivered to the mobile end device manufacturer, thereby making available the secure element to the mobile end device manufacturer. Alternatively, the chip set is a fully integrated system-on-chip, in which also the secure element is already integrated.

At a point in time after the SE public key has been transferred to the hardware security module HSM, there takes place c) in the hardware security module HSM a generating or making available of an asymmetric HSM key pair that comprises an HSM public key and a HSM private key; (d) in the hardware security module HSM, starting from the HSM private key and the SE public key, a deriving of a secret shared with the secure element, which secret is configured as at least one symmetric key.

After the secure element has been delivered to the manufacturer of the end device, the secret shared between the hardware security module HSM and the secure element enables confidential communication between the hardware security module HSM and the secure element, which cannot be accessed by the manufacturer of the end device. Even when the hardware security module HSM is later put at the disposal of the manufacturer of the end device, the latter has no access to the keys and data processed in the HSM.

This means that the actual personalization of the secure element can now take place in a confidential manner.

For this purpose there takes place (e) in the hardware security module HSM, a making available of an operating system packet, by which at least one operating system is comprised, and encrypting of at least the operating system packet with a transport key, which is formed by the shared secret or a part thereof, or is derived from the shared secret. By encryption with the transport key an encrypted operating system packet is generated.

Furthermore, there takes place (f) in the hardware security module HSM, a generating of a memory image BLOB that is suitable and set up for programming the secure element, which memory image comprises at least the encrypted operating system packet and the HSM public key.

After the encrypted operating system packet and the memory image have been generated in the hardware security module, there takes place (g) an operating of a data connection between the hardware security module HSM and the secure element and a transmitting of the memory image from the hardware security module (to a personalization server and from there further) to the secure element permanently installed in the mobile end device. For the data connection to be operable, the hardware security module equipped with the memory image can be physically handed over to the manufacturer of the end device. Alternatively, a remote data connection can be operated between the hardware security module HSM and a personalization server at the manufacturer of the end device, and the memory image is loaded into the secure element by the hardware security module via the remote data connection and the personalization server. The data connection from the hardware security module to the secure element runs selectively physically from the hardware security module via the end device to the secure element.

This completes the personalization process that takes place outside of the secure element and outside of the end device.

The further steps take place within the unit formed by the secure element and the mobile end device.

First, there takes place (h) in the secure element, an extracting of the HSM public key from the memory image and, starting from the SE private key (provided in the secure element itself) and the received HSM public key, a deriving of the shared secret and the transport key, and a decrypting of the encrypted operating system packet by means of the transport key.

Further, there takes place (i) in the secure element, a making available, generating or deriving of a symmetrical NVM encryption key that is individual to the secure element and different from the transport key, and an encrypting of the decrypted operating system packet with the NVM encryption key. The NVM encryption key is the permanent (lasting) key that is used to lastingly encrypt the operating system and any personalization data.

Further, there takes place (j) by the secure element, a storing of the operating system packet, which was initially decrypted and then encrypted again with the individual symmetric NVM encryption key, in an NVM memory of the mobile end device that is arranged outside of the secure element. By storing the operating system packet in the NVM memory, an operating system is made available that is executable in the secure element. The operating system packet is preferably executable exclusively in the secure element, in other words it can be executed in the secure element and cannot be executed in the mobile end device, in a different chip of the chip set of the end device.

The integrated secure element was personalized using the method described above, wherein an operating system was stored in the NVM memory of the mobile end device. Due to the encryption infrastructure set up between the secure element and the hardware security module prior to delivery of the secure element, the secure element manufacturer and/or the operating system manufacturer retains power of disposal over the operating system and the personalization process.

Therefore, a method for personalizing a secure element permanently installed in a mobile end device is created, in which the manufacturer of the secure element or/and the manufacturer of the operating system retain power of disposal over the personalization process, and the control of the personalization process is not fully passed on to the manufacturer of the mobile end device.

According to some embodiments of the invention, the deriving of the shared secret takes place according to the Elliptic Curve Integrated Encryption Scheme, or ECIES for short, in some embodiments according to the Diffie-Hellman DH key derivation method, according to some embodiments according to the Elliptic Curve Diffie Hellman ECDH key derivation method. In the Elliptic Curve Integrated Encryption Scheme, or ECIES for short, DH and ECDH methods, an encryption key and an authentication key (for ECIES: MAC key, where MAC stands for Message Authentication Key) are derived in each case. Selectively, both the transport key (the transport key is an encryption key) and an authentication key are also derived in the invention, regardless of whether ECIES, DH or ECDH or a different key derivation method is used.

According to some embodiments of the invention, keys for the Advanced Encryption Standard AES crypto system are provided as transport keys and/or NVM encryption keys. Alternatively, DES or Triple-DES keys (DES=Data Encryption Standard) can be provided as transport keys and/or NVM encryption keys. AES is currently the most common algorithm of the algorithms listed, while DES is considered obsolete and is only rarely employed.

The operating system packet can comprise one or several of the following components in addition to the operating system: personalization data for the operating system, one or several subscription profiles or profiles, profile data from profiles, one or several applications for operation hierarchically below the profiles or/and for operation independently of profiles, personalization data for profiles, personalization data for applications, other personalization data; one or several signatures over data of the operating system packet, one or several checksums, one or several message authentication codes MACs.

The operating system stored in the external NVM memory can selectively be executed exclusively in the secure element, here possibly in the processor and internal working memory of the secure element.

The secure element is configured selectively as an embedded secure element or as an integrated secure element.

The personalization is selectively started in response to an order for personalization, which contains an identifier of the personalizing secure element, e.g. a unique identifier UID. Such an order is sent, for example, by an operating system manufacturer to an end device manufacturer, and is physically made available in a personalization system employed for personalization, in particular a hardware security module HSM of such a personalization system, which the end device manufacturer employs to personalize the secure element.

Selectively, a batch comprising a plurality of secure elements is personalized in batch operation. An order for such a batch contains several identifiers for several secure elements to be personalized, e.g. UIDs.

In summary, the invention creates a method for personalizing a secure element that is permanently installed in a mobile end device, including agreement on a shared secret between the secure element and a hardware security module, HSM, encryption of an operating system—and, possibly, of personalization data and/or one or several profiles—in the HSM based on the shared secret and transfer of the encrypted operating system to the secure element, as well as re-encrypting the operating system in the secure element for storage in an NVM memory of the mobile end device that is disposed outside of the secure element.

BRIEF DESCRIPTION OF THE DRAWINGS

In the following the invention will be explained in more detail on the basis of embodiment examples and with reference to the drawing, in which there are shown.

DETAILED DESCRIPTION OF EMBODIMENT EXAMPLES

Figure 1:
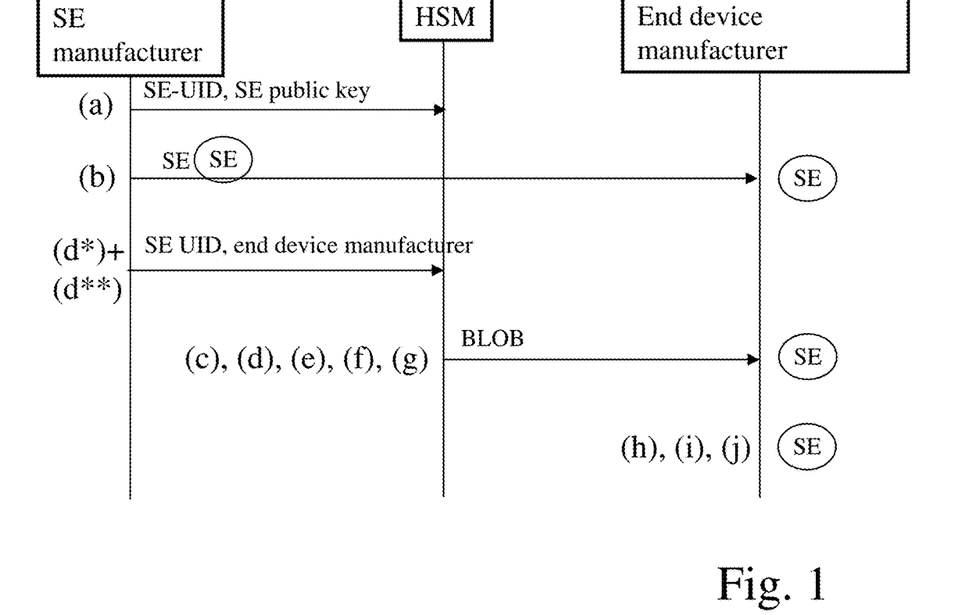
FIG. 1 in a schematic representation a method for personalizing a secure element, according to embodiments of the invention.

FIG. 1 shows a schematic representation of a method for personalizing a secure element according to embodiments of the invention.

The method comprises the following steps.

Step (a): Making available the secure element SE at a secure element manufacturer. In the secure element SE, generating or/and of an asymmetric SE key pair assigned to the secure element, which comprises a SE private key and a SE public key. The SE private key does not leave the secure element. Transmitting of the SE public key and an identifier SE-UID of the secure element SE, for example the ETSI Unique Identifier UID, to a hardware security module HSM arranged outside of the secure element SE. The transmitting of the SE public key can take place via several stations. For example, the SE public key is first transmitted out of the secure element SE to a server of the secure element manufacturer and subsequently transmitted from the server of the secure element manufacturer to a hardware security module HSM.

The form of key distribution described above corresponds to a concept of SE-internal key derivation, also called on-board (in the SE) key derivation or on-board key generation.

In an alternative concept of key distribution, also called key injection, the asymmetric SE key pair assigned to the secure element is generated or/and derived in the hardware security module HSM. The SE public key is later employed by the HSM itself or by another HSM, and the SE private key is transmitted by the hardware security module HSM to the secure element SE, or in other words injected by the hardware security module HSM into the secure element SE. The SE private key subsequently does not leave the secure element SE any more.

The hardware security module HSM is afterwards made available to a manufacturer of operating systems, for example. This can selectively take place by physically making available the hardware security module HSM to the manufacturer of operating systems. Alternatively, the hardware security module HSM can remain physically with the secure element manufacturer and the operating system manufacturer can gain access to the hardware security module HSM by operating a remote data connection. It is also possible for keys to be transmitted from one hardware security module HSM to another hardware security module HSM via a secure mechanism, so that several hardware security modules HSM are used in the personalization process.

Step (b): Making available of the secure element SE to a manufacturer of mobile end devices and permanent installation of the secure element SE in a mobile end device. The remaining components of the conventional chip set of the mobile end device are or were installed in the mobile end device at some point in time, as well as a non-volatile NVM memory intended for the secure element SE. The secure element SE can selectively be made available to the end device manufacturer as a separate component. Alternatively, the secure element SE is first made available to a chip set manufacturer and installed in the chip set by them. The chip set manufacturer makes the chip set with the secure element available to the end device manufacturer. According to a further alternative, the secure element SE is fully integrated in terms of production technology on a single chip or system, as a partial structure on the chip surface of the chip set. In this case, the chip set manufacturer makes the chip set including the secure element SE available to the end device manufacturer. The partial structure of the secure element SE can be manufactured on behalf of a secure element manufacturer, or the chip set manufacturer is also the secure element manufacturer at the same time.

The mobile end device at the end device manufacturer is now ready for personalization of the secure element SE by importing an operating system and personalization data into the combination of end device and secure element SE.

The end device manufacturer has access to a hardware security module HSM, which contains the public key of the secure element SE to be personalized. For this purpose, the HSM can be made available physically at the end device manufacturer or connected via a remote data connection.

Step (d*): in order to cause the personalization of the secure element SE, a manufacturer of operating systems for secure elements sends an order to personalize the secure element SE with an operating system and personalization data to the hardware security module HSM. The order contains an identifier of the secure element SE to be personalized, e.g. the unique identifier UID of the secure element SE, as well as, if required, a specification of the end device manufacturer concerned.

Instead of an order for only a single secure element SE, (d**) an order for the personalization of several secure elements can be provided. In this case, the order contains the identifiers, e.g. UIDs, of all secure elements to be personalized.

Step (c) takes place now at the latest: in the hardware security module HSM, generating or making available an asymmetric HSM key pair, which comprises a HSM public key and a HSM private key. This step (c) can also already have taken place in the HSM before the order for personalization has been received in the HSM.

Step (d), on the other hand, only takes place in response to the receipt of the order: in the hardware security module HSM, starting from the HSM private key and the SE public key, deriving a secret shared with the secure element SE, which is configured as at least one symmetric key. Selectively, the shared secret comprises a symmetric key, but preferably two symmetric keys. The one or the first key is a transport key (the transport key is an encryption key), or such a transport key is derived from the one/first key. The second key is an authentication key, or an authentication key is derived from the second key.

Next step (e) takes place: in the hardware security module HSM, making available an operating system packet, which comprises the operating system and the personalization data. Selectively, one or several applications for the secure element SE can already be provided in the operating system packet, which are later to be executable in the secure element SE. Selectively, in addition a checksum, for example a message authentication code MAC is.

The operating system packet is encrypted with the previously derived transport key to generate an encrypted operating system packet.

After the encryption of the operating system packet, step (f) takes place: in the hardware security module HSM, generating of a memory image BLOB that is suitable and set up for programming the secure element SE, said memory image comprising at least the encrypted operating system packet and the HSM public key, and, if available, the checksum, e.g. the message authentication code MAC.

Step (g) now takes place: operating a data connection between the hardware security module HSM and the secure element SE and transmitting the memory image BLOB from the hardware security module HSM to the secure element SE permanently installed in the mobile end device, and receiving the memory image BLOB in the secure element SE.

After the memory image BLOB has been received in the secure element SE, step (h) takes place: in the secure element SE, extracting the HSM public key from the memory image BLOB, and, starting from the SE private key and the HSM public key, deriving the shared secret and the transport key, and decrypting the encrypted operating system packet by means of the transport key.

Further, step (i) takes place: in the secure element SE, making available, generating or deriving a symmetric NVM encryption key that is individual to the secure element SE and that is different from the transport key, and encrypting the decrypted operating system packet with the NVM encryption key.

After encrypting the decrypted operating system packet with the NVM encryption key, step (j) takes place: by the secure element SE, storing the operating system packet decrypted and encrypted again with the individual symmetric NVM encryption key in an NVM memory of the mobile end device arranged outside of the secure element SE. By storing the operating system packet in the NVM memory NVM, the secure element SE is equipped with an operating system that can be executed in the secure element SE, which is already personalized with the personalization data and, possibly, which already has the one or several applications at its disposal that were likewise made available in the operating system packet.

Figure 2:
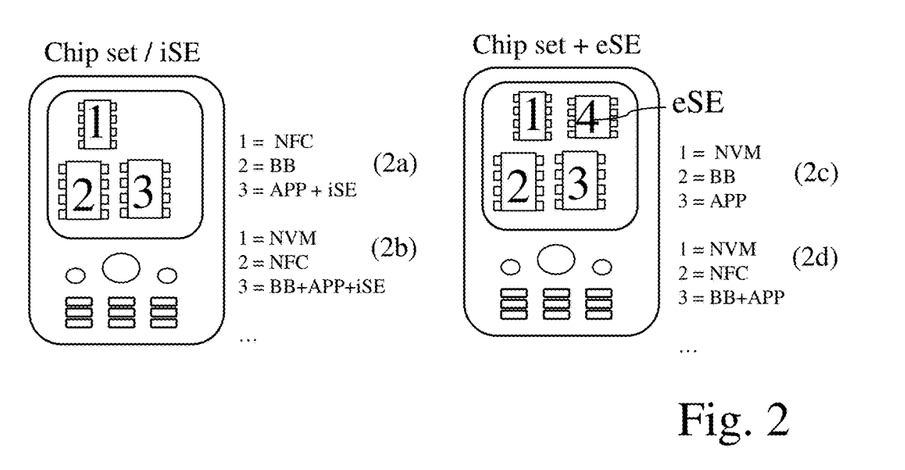
FIG. 2 in a schematic representation four possible arrangements of a chip set and a secure element in an end device, suitable for the method according to the invention.

FIG. 2 shows, in a schematic representation, four possible arrangements of a chip set and a secure element in an end device, suitable for the method according to the invention.

According to FIG. 2(a), the chip set comprises a first NFC chip module 1 (NFC=near field communication), a second baseband processor chip module BB 2, and a third chip module 3, on which an application Processor APP and an integrated secure element iSE are integrated.

According to FIG. 2(b), the chip set comprises a first NVM chip module 1 on which a non-volatile NVM memory is integrated, which is assigned to the secure element iSE (see below), a second NFC chip module NFC 2 and a third chip module 3, on which a baseband processor BB, an application processor APP and an integrated secure element iSE are integrated.

According to FIG. 2(c), the chip set comprises a first NVM chip module 1 on which a non-volatile NVM memory is integrated, which is assigned to the secure element iSE (see below), a second baseband processor chip Module BB 2, and a third application processor chip module 3. In addition to the chip set of the end device, an embedded secure element eSE is provided on a fourth chip module 4 in the end device.

According to FIG. 2(d), the chip set comprises a first NVM chip module 1 on which a non-volatile NVM memory is integrated, which is assigned to the secure element iSE (see below), and a second NFC chip module NFC 2 and a third chip module 3, on which a baseband processor BB and an application processor APP are provided. In addition to the chip set of the end device, an embedded secure element eSE is provided on a fourth chip module 4 in the end device.

Figure 3:
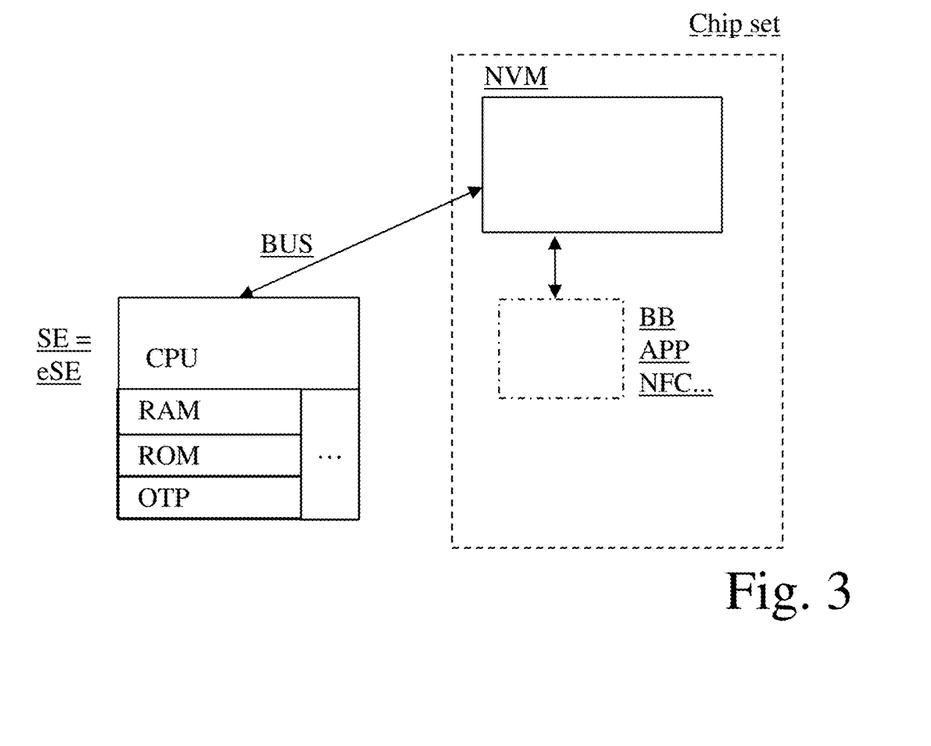
FIG. 3 in a schematic representation a possible arrangement of a chip set and an embedded secure element in an end device, suitable for the method according to the invention.

FIG. 3 shows a schematic representation of a possible arrangement of a chip set and an embedded secure element eSE in an end device, suitable for the method according to the invention. The embedded secure element eSE comprises a secure processor CPU, an internal RAM of the embedded secure element eSE, an internal permanent ROM memory ROM of the embedded secure element eSE and a write-once permanent OTP memory OTP of the embedded secure element eSE. The storage capacity of the internal non-volatile ROM memory ROM and the write-once non-volatile OTP memory OTP is very small. A non-volatile NVM memory NVM, which is assigned to the embedded secure element eSE and can be used thereby, is provided in the chip set of the end device. Further elements of the chip set of the end device such as an application processor APP, baseband processor (modem) BB and NFC processor NFC are only indicated in FIG. 3.

Figure 4:
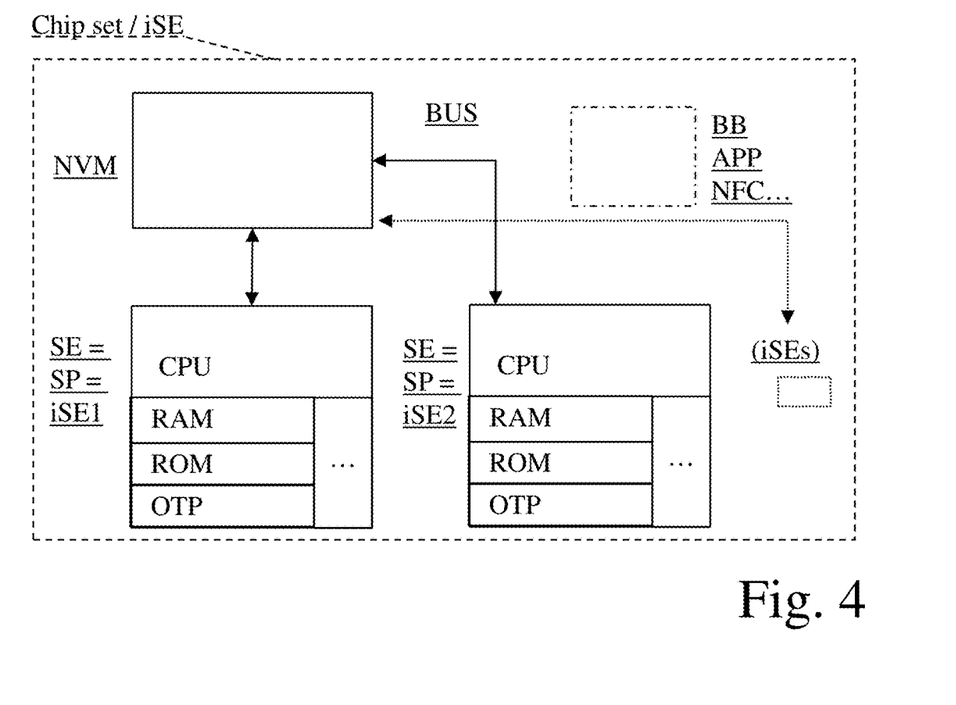
FIG. 4 in a schematic representation a possible arrangement of a chip set and two integrated secure elements in an end device, suitable for the method according to the invention.

FIG. 4 shows a schematic representation of a possible arrangement of a chip set and two integrated secure elements iSE1, iSE2 in an end device, suitable for the method according to the invention. The internal structure of each integrated secure element iSE1, iSE2 with CPU, RAM, ROM, OTP is substantially the same as that of the embedded secure element eSE shown in FIG. 3. In contrast to the embedded secure element eSE, the integrated secure elements iSE1, iSE2 are integrated directly into the chip set of the end device. In the chip set of the end device, there is provided a non-volatile NVM memory NVM assigned to the integrated secure elements iSE1, iSE2, said memory having its own memory area for each of the two integrated secure elements iSE1, iSE2, which can only be accessed by the respective iSE. Alternatively, for each of the integrated secure elements iSE1, iSE2 there can be provided its own assigned non-volatile NVM memory NVM that can be used thereby. Further elements of the chip set of the end device such as an application processor APP, baseband processor (modem) BB and NFC processor NFC are only indicated in FIG. 4.

Figure 5:
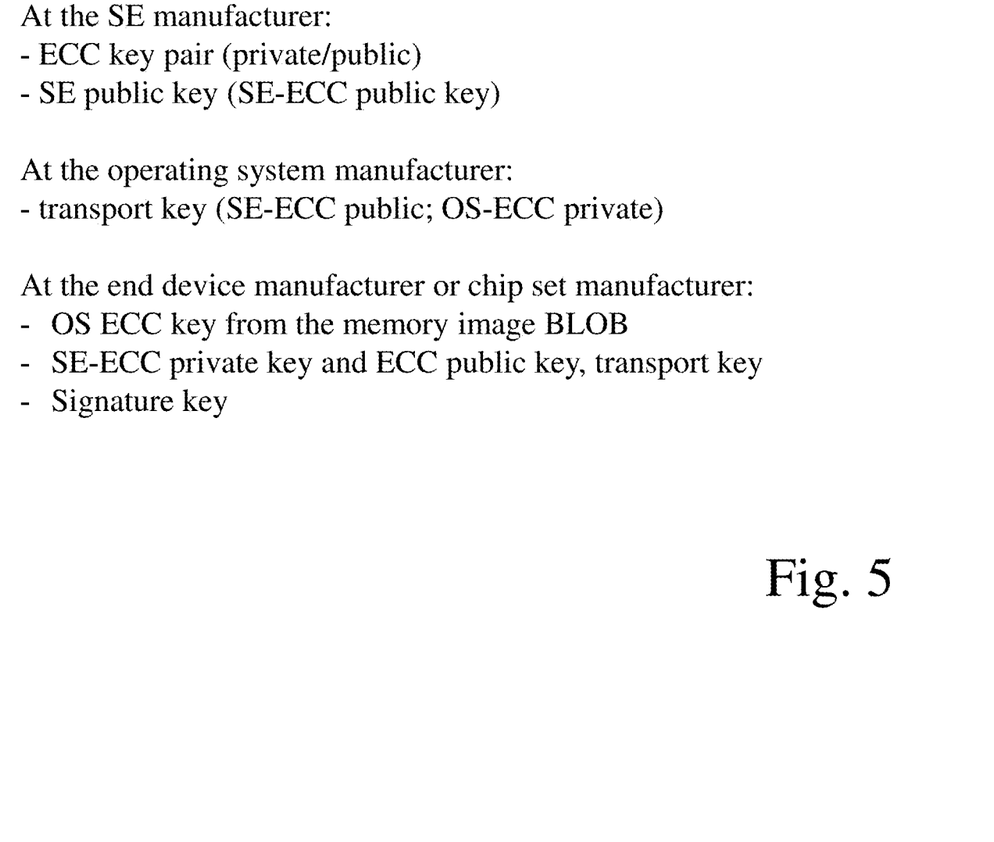
FIG. 5 a personalization process according to an embodiment of the invention.

FIG. 5 shows a personalization procedure according to an embodiment of the invention.

FIG. 5: At the SE manufacturer:
generate as the SE key pair: ECC key pair (private/public);

read out the SE public key (SE ECC public key) and UID from the SE;
send UID and SE public key to operating system manufacturer.

FIG. 5: At the operating system manufacturer:
generate a transport key with the SE ECC public key and own OS ECC private key
generate memory image BLOB comprising operating system and personalization data and the OS ECC public key to the OS ECC private key;
encrypt BLOB with transport key;
compute signature over memory image BLOB by means of the operating system manufacturer's own signature key.

FIG. 5: At the end device manufacturer or chip set manufacturer:
Secure element SE has an initial bootloader. Replace the initial bootloader with a bootloader of the operating system manufacturer by means of a hardware security module HSM in the secure element SE. The operating system manufacturer's bootloader comprises the signature key with which the signature over the BLOB memory image was generated. Extract the OS ECC public key from the memory image BLOB. Generate the transport key in the HSM using the SE ECC private key and the ECC public key; it is the same transport key that has been derived from the operating system manufacturer with the SE ECC public key and the ECC private key. Use the transport key to decrypt step by step the data/code segments of the operating system and personalization data from the BLOB memory image. Encrypt data/code segments of the operating system and personalization data with an SE-individual NVM encryption key and write the resulting cipher text step by step into the external NVM memory in the chip set of the end device. Verify the signature over the memory image BLOB with the signature key.

Figure 6:
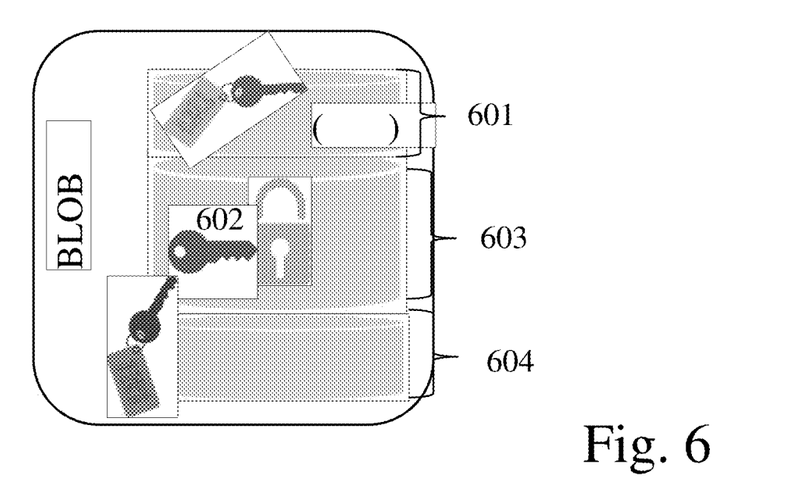
FIG. 6 a memory image according to an embodiment of the invention.

FIG. 6 shows a memory image BLOB according to an embodiment of the invention. The BLOB comprises an operating system including personalization data, and a profile (subscription profile).

The generation, structure and employment of a memory image BLOB with the participation of an operating system manufacturer is explained with reference to FIG. 6.

601: The operating system manufacturer generates a BLOB-individual ECC public key in an HSM, said key being employed as the basis for an ECIES (Elliptic Curve Integrated Encryption Scheme) method.

602: Chip-individual BLOB encryption key (AES128): This key is employed to encrypt/decrypt the "BLOB data". This key is NOT transferred in the BLOB, it is the output of the ECIES (when computed in the SE: input: SE-individual ECC private key+G+D BLOB-individual ECC public key; output: shared secret). KDF (shared secret)=BLOB encryption key. (A MAC-ing key is also generated with ECIES).

603: The "BLOB data" composed of the OS code (operating system code) and the profile data (including chip-individual MNO access data). This segment is transferred in a state encrypted with the chip-individual BLOB encryption key. (This (encrypted) segment should also be MAC-activated.)

604: Signature over the BLOB: The signature is generated using an operating-system-manufacturer signature key (within the operating system manufacturer HSM) over the pure BLOB data—the signature itself, however, is encrypted using the chip-individual BLOB encryption key.

The (operating-system-manufacturer) signature verification key is integrated into a customized version of the bootloader and the signature is verified during loading of the BLOB into iSE/external NVM.

In the following, a secure personalization concept: ECIES—Elliptic Curve Integrated Encryption Scheme—(with ECDH) is explained, according to an embodiment of the invention. OS=operating system.
1. An ECC key pair is generated on-chip in the iSE.
2. Send ECC public key from iSE to G+D HSM.
3. OS manufacturer HSM generates a random value (ECC private key) for each BLOB and computes the corresponding ECC public key.
4. In the G+D HSM: (iSE) ECC public key+(G+D) ECC private key=shared secret KDF=shared (secret) symmetric key pair (individual chip/BLOB and MACing key).
5. In the OS manufacturer HSM: The BLOB data is encrypted with this symmetric key.
6. The complete packet (OS-manufacturer ECC public key+ encrypted (and signed) BLOB is sent to the end device manufacturer and loaded into iSE by them.
7. In the iSE: (OS-manufacturer) ECC public key (from the BLOB packet)+(iSE) ECC private key=shared secret KDF=shared (secret) symmetric key pair (individual chip/BLOB and MACing key).
8. In the iSE: Employing the symmetric key for decrypting the BLOB data and MAC verification.

The invention claimed is:
1. A method for personalizing a secure element (SE), which is permanently installed in a mobile end device, the personalizing comprising equipping the secure element with an operating system executable in the secure element, the method comprising the steps:
   (a) making available the secure element, and, prior to permanently installing the secure element in the mobile end device, making available an SE private key of an asymmetric SE key pair in the secure element, and making available the SE public key of the same SE asymmetric key pair in a hardware security module (HSM) arranged outside of the secure element;
   (b) after making available the SE private key to the secure element and the SE public key to the hardware security module, making available the secure element to a manufacturer of the mobile end device and permanently installing the secure element in a mobile end device;
   (c) in the hardware security module, generating or making available an asymmetric HSM key pair comprising an HSM public key and an HSM private key;
   (d) in the hardware security module, starting from the HSM private key and the SE public key, deriving a secret shared with the secure element, which secret is configured as at least one symmetric key;
   (e) in the hardware security module, making available an operating system packet, by which at least one operating system, or at least part of an operating system, is comprised, and encrypting at least the operating system packet with a transport key, which key is formed by the shared secret or part thereof, or which is derived from the shared secret, to generate an encrypted operating system packet;
   (f) in the hardware security module, generating a memory image that is suitable and set up for programming the secure element, wherein the memory image comprises at least the encrypted operating system packet and the HSM public key;
   (g) operating a data connection between the hardware security module and the secure element and transmit- ting the memory image from the hardware security module to the secure element permanently installed in the mobile end device;
(h) in the secure element, extracting the HSM public key from the memory image, and, starting from the SE private key and the HSM public key, deriving the shared secret and the transport key and decrypting the encrypted operating system packet by means of the transport key;
(i) in the secure element, making available, generating or deriving a symmetric NVM encryption key that is individual to the secure element and different from the transport key, and encrypting the decrypted operating system packet with the NVM encryption key;
(j) by the secure element, storing the operating system packet, which has been decrypted and encrypted again with the individual symmetric NVM encryption key, in an NVM memory of the mobile end device that is arranged outside of the secure element, wherein by the storing of the operating system packet in the NVM memory, the secure element is equipped with an operating system executable in the secure element.

2. The method according to claim 1,
(k) wherein the secure element comprises a working memory and a processor, and
wherein the operating system packet is stored in the non-volatile NVM memory of the mobile end device in such a manner that the secure element can load the operating system from the non-volatile NVM memory of the mobile end device into the working memory of the secure element and bring it to execution in the processor of the secure element.

3. The method according to claim 1, wherein the operating system can be brought to execution exclusively in the secure element, therein possibly in the processor and internal working memory of the secure element.

4. The method according to claim 1, wherein the shared secret comprises at least two symmetric keys, namely at least a first and a second symmetric key,
wherein the transport key is formed by the first symmetric key or is derived therefrom, and
wherein an authentication key is formed by the second symmetric key or is derived therefrom, and
wherein the memory image further comprises the authentication key, further wherein:
step (e) additionally comprises: in the hardware security module, generating a check code, including a message authentication code, over the encrypted operating system;
step (h) additionally comprises: in the secure element, extracting and verifying the check code, from the memory image.

5. The method according to claim 1, wherein the operating system packet further comprises personalization data for personalizing the operating system,
wherein, by the storing of the operating system packet in the non-volatile NVM memory, an operating system is made available that is personalized with the personalization data and executable in the secure element.

6. The method according to claim 5, wherein the operating system packet further comprises a signature, the method further comprising the steps of:
on the occasion of step (a), making available a signature verification key from the hardware security module to the secure element; and
on the occasion of step (e) or (f), in the hardware security module, generating the signature over the operating system and additionally over the personalization data or/and over the profile or profiles by means of a signature generation key corresponding to the signature verification key.

7. The method according to claim 1, wherein the operating system packet further comprises profile data for a profile or several profiles or/and one or several applications,
wherein, by the storing of the operating system packet in the non-volatile NVM memory, there are additionally stored in the non-volatile NVM memory a profile or several profiles or/and one or several applications, encrypted with the NVM encryption key, so that the profile or profiles or/and the application or applications is/are executable in the secure element, exclusively executable in the secure element.

8. The method according to claim 1, comprising the further step, which takes place prior to step (e):
(d*) at the hardware security module, receiving, from a manufacturer or administrator of the operating system or of the secure element, an order to personalize the secure element;
wherein step (e) comprises in the hardware security module, making available and encrypting the operating system packet, and the subsequent steps (f)-(j) are carried out in response to receiving the order.

9. The method according to claim 1, wherein the secure element is configured as an integrated secure element, which is provided as a secure processor unit in a chip of the chip set of the mobile end device,
wherein the chip set comprises at least the secure processor unit, an application processor and a baseband processor, and
wherein, upon the permanent installation of the secure element in the mobile end device, the chip set is installed in the mobile end device in a galvanically connecting manner.

10. The method according to claim 1, wherein the secure element is configured as an embedded secure element which is provided in a chip module that can be installed in a galvanically connecting manner, arranged to be soldered in, and
wherein, upon the permanent installation of the secure element in the mobile end device, the chip module is installed in the mobile end device in a galvanically connecting manner.

11. The method according to claim 1,
wherein to each secure element there is assigned a unique chip identifier, comprising the additional step executed prior to step (e):
(d**) at the hardware security module, receiving one or several chip identifiers; and selecting one or several secure element or elements to be personalized on the basis of the chip identifier.

12. The method according to claim 11,
wherein an order for personalizing a list of one or several secure elements is provided as the order, and
wherein in the order a chip identifier of the secure element is specified for each secure element of the list.

13. The method according to claim 1, wherein the operating system is transferred from the hardware security module to the secure element in a manner divided into several parts in several transfer processes, and
wherein the operating system packet comprises a part of the total number of parts of the operating system, and wherein, in order to transfer the complete operating system from the hardware security module to the secure element, the method is carried out several times in succession; or/and wherein the operating system and the personalization data and the profiles are transferred from the hardware security module to the secure element in a manner divided into several parts in several transfer processes, and wherein the personalization data or parts thereof or/and the profile or the profiles or some of them, are transferred according to the method from the hardware security module to the secure element in one or several operating system packets separate from the operating system packet or operating system packets of the operating system.

14. The method according to claim 1, wherein step (a) for making available the SE private and public key comprises one of the two options (a1) or (a2):
   (a1) in the secure element, generating an asymmetric SE key pair comprising the SE private key and the SE public key; and making available the SE public key of the asymmetric SE key pair in a hardware security module arranged outside of the secure element; or
   (a2) in a hardware security module arranged outside of the secure element, generating an asymmetric SE key pair comprising the SE private key and the SE public key; and making available the SE private key of the asymmetric SE key pair in the secure element.

15. A method for personalizing a secure element (SE), which is permanently installed in a mobile end device, the personalizing comprising equipping the secure element with an operating system executable in the secure element, the method comprising the steps:
   (a) making available the secure element;
   (b) in a security module (HSM) arranged outside of the secure element, making available an operating system packet, by which at least one operating system, or at least part of an operating system is comprised, and encrypting at least the operating system packet with a transport key;
   (c) operating a data connection between the security module (HSM) and the secure element and transmitting the encrypted operating system packet from the security module to the secure element permanently installed in the mobile end device;
   (d) in the secure element, decrypting the encrypted operating system packet by means of the transport key;
   (e) in the secure element, making available, generating or deriving a symmetric NVM encryption key that is individual to the secure element and different from the transport key, and encrypting the decrypted operating system packet with the NVM encryption key;
   (f) by the secure element, storing the operating system packet, which has been decrypted and encrypted again with the individual symmetric NVM encryption key, in an NVM memory of the mobile end device that is arranged outside of the secure element;
   wherein by the storing of the operating system packet in the NVM memory, the secure element is equipped with an operating system executable in the secure element;
   the method further comprising:
   prior to permanently installing the secure element in the mobile end device, making available an SE private key of an asymmetric SE key pair in the secure element, and making available the SE public key of the same SE asymmetric key pair in said security module arranged outside of the secure element;
   after making available the SE private key to the secure element and the SE public key to the security module, making available the secure element to a manufacturer of the mobile end device and permanently installing the secure element in a mobile end device;
   in the security module, generating or making available an asymmetric HSM key pair comprising an HSM public key and an HSM private key;
   in the security module, starting from the HSM private key and the SE public key, deriving a secret shared with the secure element, which secret is configured as at least one symmetric key.

16. The method according to claim 15, wherein the transport key is formed by the shared secret or part thereof, or is derived from the shared secret, to generate an encrypted operating system packet.

17. The method according to 15, further comprising:
   in the security module, generating a memory image that is suitable and set up for programming the secure element, wherein the memory image comprises at least the encrypted operating system packet and the HSM public key;
   in step (c), transmitting the memory image;
   in step (d), extracting the HSM public key from the memory image, and, starting from the SE private key and the HSM public key, deriving the shared secret and the transport key, and decrypting the encrypted operating system packet by means of the transport key.

18. The method according to claim 15, further comprising: after making available the SE private key to the secure element and the SE public key to the security module, making available the secure element to a manufacturer of the mobile end device and permanently installing the secure element in a mobile end device.

19. The method according to claim 15, wherein the secure element comprises a working memory and a processor, and wherein the operating system packet is stored in the non-volatile NVM memory of the mobile end device in such a manner that the secure element can load the operating system from the non-volatile NVM memory of the mobile end device into the working memory of the secure element and bring it to execution in the processor of the secure element.

* * * * *